United States Patent
Ernst

(10) Patent No.: US 9,566,988 B2
(45) Date of Patent: *Feb. 14, 2017

(54) LOCATING OF VEHICLES

(71) Applicant: SIEMENS AKTIENGESELLSCHAFT, Munich (DE)

(72) Inventor: Horst Ernst, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/650,356

(22) PCT Filed: Nov. 20, 2013

(86) PCT No.: PCT/EP2013/074248
§ 371 (c)(1),
(2) Date: Jun. 8, 2015

(87) PCT Pub. No.: WO2014/086582
PCT Pub. Date: Jun. 12, 2014

(65) Prior Publication Data
US 2015/0321682 A1    Nov. 12, 2015

(30) Foreign Application Priority Data
Dec. 6, 2012   (DE) .......... 10 2012 222 471

(51) Int. Cl.
*G01N 21/00* (2006.01)
*G01P 3/54* (2006.01)
(Continued)

(52) U.S. Cl.
CPC .............. *B61L 25/02* (2013.01); *B61L 25/025* (2013.01); *B61L 25/026* (2013.01); *G01S 7/4861* (2013.01); *G01S 17/06* (2013.01)

(58) Field of Classification Search
CPC ............ G01M 11/30; G01N 2201/088; G01N 2201/0886; G01V 1/001; G01D 5/268; G01D 5/35354; G01D 5/35358; G01D 5/35361; G01D 5/353641; B61L 1/06; B61L 1/14; B61L 1/165; B61L 1/166; B61L 25/02; B61L 25/025
(Continued)

(56) References Cited

U.S. PATENT DOCUMENTS 4,151,969 A * 5/1979 Wood .................. B61L 17/00
246/122 R
5,330,136 A    7/1994 Colbaugh
(Continued)

FOREIGN PATENT DOCUMENTS

CN   1137662       12/1996
CN   1822976 A    8/2006
(Continued)

*Primary Examiner* — Sunghee Y Gray
(74) *Attorney, Agent, or Firm* — Laurence Greenberg; Werner Stemer; Ralph Locher

(57) ABSTRACT

A method for locating a rail vehicle along a rail route, along which a waveguide is laid. Temporally successive electromagnetic pulses are fed into the waveguide and, for each emitted pulse, at least one back-scattering pattern generated by vehicle-induced back-scattering of the electromagnetic pulse is received and evaluated. The waveguide has at least one locating section along the rail route, in which locating section the vibration sensitivity of the waveguide and/or the vibration acting on the waveguide is greater or less than outside the locating section. The amplitude of the received back-scattering pattern is evaluated and a location signal is generated if the amplitude of the received back-scattering pattern increases or decreases over the course of time.

15 Claims, 7 Drawing Sheets

(51) Int. Cl.
  *G01J 1/04* (2006.01)
  *B61L 25/02* (2006.01)
  *G01S 17/06* (2006.01)
  *G01S 7/486* (2006.01)

(58) Field of Classification Search
  USPC .. 356/73.1; 246/122 R, 128, 182 A, 30, 130, 246/167 R, 125, 167 D, 182 R, 182 B H, 246/182; 73/597, 628; 324/83 D, 171; 385/12, 13
  See application file for complete search history.

(56) References Cited

U.S. PATENT DOCUMENTS

| | | | |
|---|---|---|---|
| 5,355,208 A * | 10/1994 | Crawford | G01D 5/35383 250/227.19 |
| 5,684,489 A | 11/1997 | Fournier | |
| 7,688,673 B2 * | 3/2010 | Ronnekleiv | G01D 5/35383 181/102 |
| 7,725,252 B2 | 5/2010 | Heddebaut et al. | |
| 8,861,973 B2 | 10/2014 | Tam et al. | |
| 8,985,523 B2 | 3/2015 | Chadwick et al. | |
| 2014/0175946 A1 * | 6/2014 | Wischnewskiy | H02N 2/08 310/323.06 |
| 2015/0166087 A1 * | 6/2015 | Ernst | B61L 1/06 246/122 R |
| 2015/0274182 A1 * | 10/2015 | Arpaci | B61L 3/065 246/63 R |

FOREIGN PATENT DOCUMENTS

| | | |
|---|---|---|
| CN | 101373860 A | 2/2009 |
| CN | 102358335 A | 2/2012 |
| EP | 1582430 A1 | 10/2005 |
| FR | 2619909 A1 | 3/1989 |
| WO | 2011027166 A1 | 3/2011 |
| WO | 2012152575 A1 | 11/2012 |

* cited by examiner

LOCATING OF VEHICLES

BACKGROUND OF THE INVENTION

Field of the Invention

The invention relates to a method for determining the location of a rail vehicle along a section of rail along which a wavequide is laid. Chronologically successive electromagnetic pulses are fed into the waveguide and in each case at least one backscatter pattern which is generated by vehicle-induced backscattering of the electromagnetic pulse is received for each emitted pulse and evaluated.

Such a method is known from International Patent Application WO 2011/027166 A1. In this previously known method, a waveguide is provided for determining the location of a rail vehicle along a section of rail, said waveguide being laid along the section of rail. Electromagnetic pulses are fed into the waveguide in chronological succession. For each emitted pulse, in each case at least one backscatter pattern generated by vehicle-induced backscattering of the electromagnetic pulse is received and evaluated. The location of the rail vehicle on the section of rail is determined by evaluating the backscatter patterns.

BRIEF SUMMARY OF THE INVENTION

The invention is based on the object of specifying a method for determining the location of a vehicle which permits reliable and particularly precise determination of a location.

This object is achieved according to the invention by means of a method as claimed. Advantageous refinements of the method according to the invention are specified in dependent claims.

Accordingly, according to the invention there is provision that the waveguide along the route has at least one location-determining section in which the vibration sensitivity of the waveguide and/or the vibration acting on the waveguide is greater than or less than outside the location-determining section, the amplitude of the received backscatter patterns is evaluated, and a location signal is generated if the amplitude of the received backscatter patterns increases or decreases in the chronological sequence.

A significant advantage of the method according to the invention is to be seen in the fact that in said method a vehicle-location-determining process is possible which is independent of the time period between the transmission of electromagnetic pulses and the reception of the backscatter patterns. In the method according to the invention, a vehicle-location-determining process can be carried out independently of this time period. This is possible since the at least one location-determining section changes the backscatter pattern as such, specifically in terms of the amplitude, with the result that on the basis of the change in the backscatter pattern as such, namely the change in amplitude thereof, a vehicle-location-determining process on the route is possible. Even if fluctuations in timing therefore occur, for example owing to delays within the scope of the generation of pulses and/or within the scope of the evaluation of the backscatter patterns, these do not have any influence on the accuracy of the process of determining the location of the vehicle since the vehicle in the region of the location-determining section or sections would always generate a backscatter pattern whose amplitude characteristic indicates the location-determining section and is independent of the period of time which has passed between the feeding of the pulses into the waveguide and the reception or evaluation of the associated backscatter patterns.

In order to permit a process of determining the location of the vehicle at different points on the route or in the region of different points on the waveguide, it is considered advantageous if the route is equipped with a multiplicity of location-determining sections which are provided spaced apart from one another in the waveguide.

According to one particularly preferred refinement of the method, there is provision that the location of a rail vehicle which is traveling on a section of track is determined, wherein the vibration, acting on the waveguide, in the location-determining section is increased by means of a local mechanical coupling between the waveguide and the section of track or reduced by means of a vibration-reducing device.

Alternatively or additionally, the vibration sensitivity of the waveguide in the location-determining section can be increased or decreased by using in the location-determining section waveguide material with a higher or lower vibration sensitivity than in the two waveguide sections located in front of and behind the respective location-determining section.

In addition an additional location-determining signal which indicates the location of the vehicle is preferably generated.

Such an additional location-determining signal can be formed, for example, by measuring reflections at interference points which are introduced into the waveguide and whose position is known and by generating the additional location-determining signal if the reception of the backscatter pattern coincides chronologically with a reflection by such an interference point. The arrangement of the interference points and/or the respective length of the interference points preferably forms location coding.

Alternatively, such an additional location-determining signal can be formed by measuring the time period between the feeding of the electromagnetic pulses into the waveguide and the detection of the respectively associated backscatter pattern and generating a distance signal which indicates the location of the vehicle as an additional location-determining signal on the basis of the time period.

The location signal and the additional location-determining signal are preferably checked for plausibility.

Such plausibility checking can be carried out in a particularly simple and therefore advantageous way by comparing, in the case of the formation of a location signal, the position of the vehicle which is indicated by the additional location-determining signal (for example distance signal) with the known position of the location-determining section.

A fault signal is preferably generated if the distance between the position of the vehicle indicated by the additional location-determining signal and the known position of the location-determining section exceeds a predefined threshold value.

Furthermore, it is considered advantageous if the waveguide along the route has a multiplicity of location-determining sections in which the vibration sensitivity of the waveguide and/or the vibration acting on the waveguide is greater than or less than in the two waveguide sections located in front of and behind the respective location-determining section, and in each case a location signal is generated if the amplitude of the received backscatter patterns in the chronological sequence increases or decreases.

When the vehicle drives into the route after an initial generation of the location signal the occurrence of the further location signals is preferably counted, and location-determining information is formed with the respective counter reading.

It is also considered advantageous if the arrangement of the location-determining sections and/or the respective length of the location-determining sections forms location coding, and during the evaluation of the chronological sequence of the backscatter patterns the location coding is detected and the location-determining sections are differentiated on the basis of the location coding.

The invention also relates to a location-determining device for determining the location of a vehicle along a route, having a waveguide which is laid along the route, a pulse-generating device for generating and feeding chronologically successive electromagnetic pulses into the waveguide, and a detection device for detecting electromagnetic backscatter patterns generated by vehicle-induced backscatter, and an evaluation device for evaluating the backscatter patterns.

With respect to such a location-determining device there is provision according to the invention that the waveguide along the route has at least one location-determining section in which the vibration sensitivity of the waveguide and/or the vibration acting on the waveguide is greater than or less than in the two waveguide sections located in front of and behind the location-determining section, and the evaluation device is configured in such a way that it carries out a process of determining the location of the vehicle at least also using the amplitude of the backscatter pattern.

With respect to the advantages of the location-determining device according to the invention reference is made to the above statements with respect to the method according to the invention since the advantages of the method according to the invention correspond substantially to those of the location-determining device according to the invention.

The waveguide is preferably laid next to a section of track, and the vibration, acting on the waveguide, in the location-determining section is preferably increased by means of a local mechanical coupling between the waveguide and the section of track or reduced by a vibration-reducing device.

Additionally or alternatively, the waveguide can have, in the location-determining section, waveguide material with a higher or lower vibration sensitivity than in the two waveguide sections located in front of and behind the location-determining section.

The waveguide along the route particularly preferably has a multiplicity of location-determining sections in which the vibration sensitivity of the waveguide and/or the vibration acting on the waveguide is greater than or less than in the two waveguide sections located in front of and behind the respective location-determining section.

The arrangement of the location-determining sections and/or the respective length of the location-determining sections preferably forms location coding.

BRIEF DESCRIPTION OF THE SEVERAL VIEWS OF THE DRAWING

The invention will be explained in more detail below on the basis of exemplary embodiments; in the drawings, in each case by way of example.

DESCRIPTION OF THE INVENTION

Figure 1:
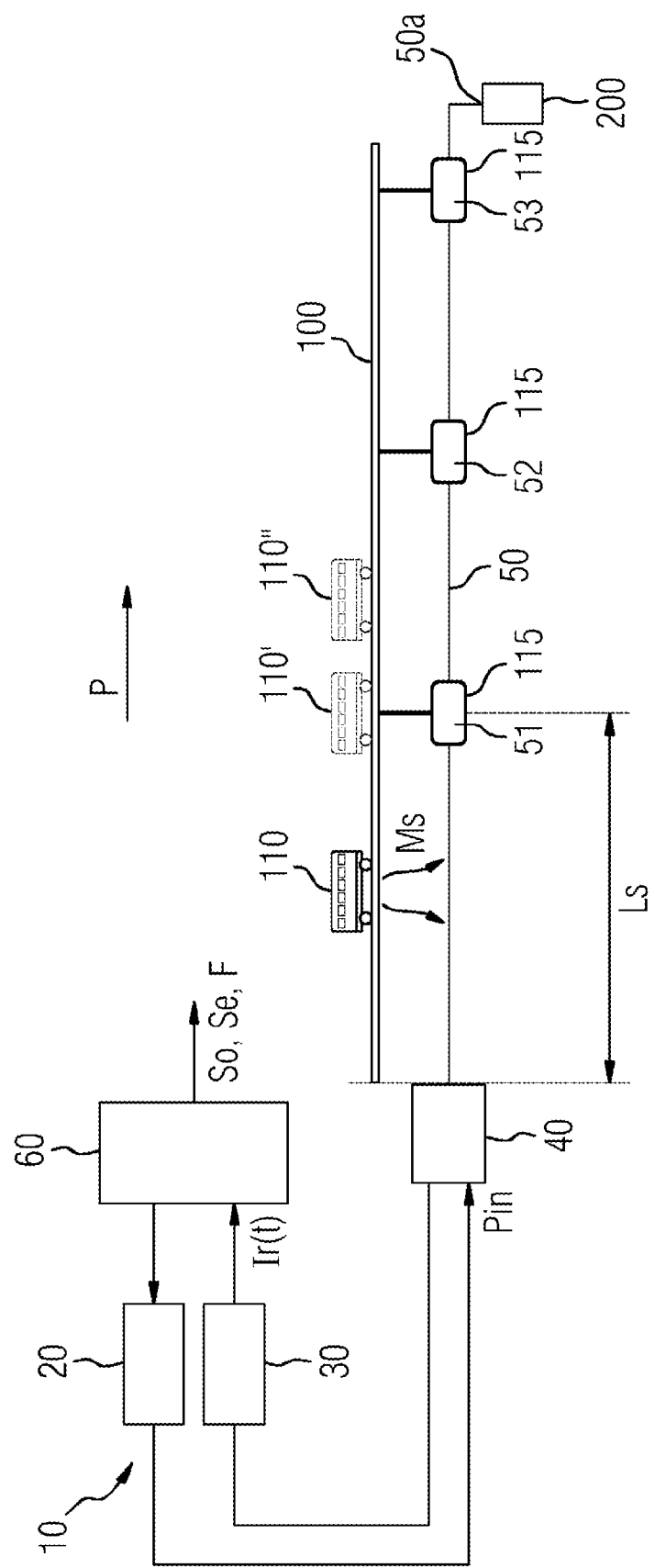
FIG. 1 shows an exemplary embodiment of a location-determining device according to the invention for determining the location of a vehicle along a route.

In the figures, the same reference symbols are always used for identical or comparable components for the sake of clarity. FIG. 1 shows a location-determining device 10 which comprises a pulse-generating device 20, a detection device 30, an optical coupling device 40, a waveguide 50, for example in the form of an optical waveguide, and an evaluation device 60.

The pulse-generating device 20 preferably has a laser (not shown further) which permits short electromagnetic, in particular optical, pulses to be generated regularly, for example with a permanently predefined pulse rate, and to be fed into the waveguide 50 via the coupling device 40. The pulse-generating device 20 is preferably actuated by the evaluation device 60, with the result that the times of the generation of pulses are at least approximately known to the evaluation device 60.

The detection device 30 has, for example, a photo detector which permits the detection of electromagnetic radiation. The detection device 30 transmits its measurement signals to the evaluation device 60 which evaluates them.

In FIG. 1 it can be seen that the waveguide 50 is arranged along a section of rail 100. A rail vehicle 110 travels on the section of rail 100 from left to right in the direction P of the arrow. In the illustration according to FIG. 1, the movement of the rail vehicle 110 in the direction P of the arrow is symbolized by two further positions (cf. rail vehicle positions 110' and 110").

FIG. 1 shows that the waveguide 50 is equipped with location-determining sections 51, 52 and 53 in which the vibration acting on the waveguide 50 as a result of the rail vehicle passing is greater than outside the location-determining sections 51, 52 and 53. The increase in the vibration in the location-determining sections 51 to 53 is due, for example, to the fact that the waveguide 50 is mechanically coupled in these sections to the tracks of the section of rail 100 by one or more connecting elements 115 in the form of rods, tubes, pins or the like (cf. FIG. 11). Additionally or alternatively, it is also possible to use in the location-determining sections 51 to 53 a waveguide material which has per se a higher vibration sensitivity than the waveguide material outside the location-determining sections 51, 52 and 53.

The location-determining device 10 according to FIG. 1 can be operated to determine the location of the rail vehicle 110, for example as follows:

The evaluation device 60 actuates the pulse-generating device 20 in such a way that it feeds electromagnetic pulses Pin in chronological succession into the waveguide 50 via the coupling device 40. The electromagnetic pulses which are generated run from left to right in the direction P of the arrow in FIG. 1 and are preferably absorbed at the end 50a of the waveguide by an absorption device 200.

The waveguide 50 is locally shaken or made to vibrate by the rail vehicle 110 traveling on the section of rail 100; this is characterized in FIG. 1 by arrows with the reference symbol Ms. Owing to these vibrations or owing to shaking of the waveguide 50, backscattering of the electromagnetic radiation will occur locally in the region in which the rail vehicle 110 is currently located. The backscattered radiation has a backscatter pattern which is characteristic of the shaking which is caused by the rail vehicle 110 and is input into the waveguide 50.

The backscattered radiation runs counter to the direction of travel P of the rail vehicle in the direction of the coupling device 40 and in the direction of the detection device 30 and is detected there by the detection device 30. The detection device 30 is configured in such a way that it measures the intensity of the radiation which is scattered back and passes on a corresponding measurement signal to the evaluation device 60. The intensity of the radiation which is scattered back is characterized by the reference symbol Ir(t) in FIG. 1.

The evaluation device 60 will evaluate the radiation Ir(t) which is scattered back and the backscatter patterns contained therein. If the amplitude of the received backscatter patterns increases in the chronological sequence, it will indicate that one of the location-determining sections 51 to 53 is being passed and generate a location signal So. This will be explained in more detail on the basis of FIGS. 2 to 4.

Figure 2:
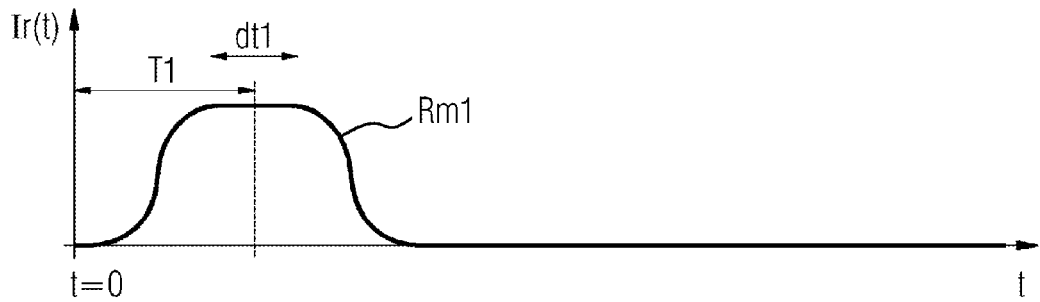
FIGS. 2-4 show by way of example backscatter patterns which are generated by a vehicle on the route according to FIG. 1.

FIG. 2 illustrates by way of example a backscatter pattern Rm1 which arrives in the evaluation device 60 when an electromagnetic pulse has been irradiated into the waveguide 50 by the pulse device 20 at the time t=0. The length of the received backscatter pattern Rm1 is characterized by the reference symbol dt1 in FIG. 2.

The backscatter pattern Rm1 relates to the position of the rail vehicle according to FIG. 1 as is characterized there with unbroken lines and the reference symbol 110.

Figure 3:
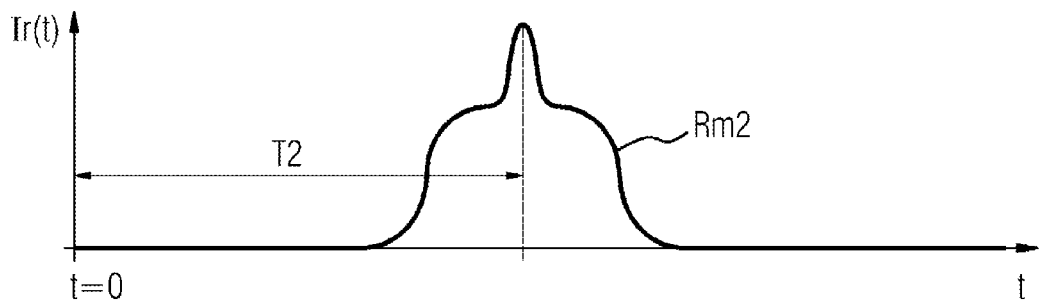

If the rail vehicle 110 then moves further in the direction P of the arrow according to FIG. 1 and reaches the position characterized by the reference symbol 110', it will cause the location-determining section 51 of the waveguide 50 to experience mechanical oscillations. In the region of the location-determining section 51 the vibration acting on the waveguide 50 and/or the vibration sensitivity thereof is however very much greater than outside the location-determining sections 51-53, with the result that the amplitude of the backscatter pattern is increased. This is illustrated in FIG. 3.

When the rail vehicle 110 leaves the region of the location-determining section 51 again and arrives in the region between the two location-determining sections 51 and 52 according to FIG. 1 (cf. the position of the rail vehicle in FIG. 1 which is characterized by the reference symbol 110"), the amplitude of the backscatter pattern will be reduced again to the normal amount. Accordingly, the amplitude of the backscatter pattern Rm3 (cf. FIG. 4) corresponds again to the original amplitude of the backscatter pattern Rm1 according to FIG. 2.

In summary, the evaluation device 60 is therefore able to determine the location of the rail vehicle 110 on the section of rail 100 on the basis of the amplitudes of the backscatter patterns Rm1, Rm2 and Rm3 because the local position of the location-determining sections 51 to 53 along the section of rail 100 is known.

By counting the location signals So generated on the output side by the evaluation device 60 it is therefore possible to track the travel of the rail vehicle.

The arrangement of the location-determining sections and/or the respective length of the location-determining sections preferably forms location coding.

In addition to a process of determining the location of the rail vehicle 110 on the basis of the location-determining sections 51 to 53, the detection device 30 can also perform a location-determining process on the basis of the time periods which occur between the feeding of the electromagnetic pulses Pin into the waveguide 50 and the detection of the respectively associated backscatter pattern Rm1, Rm2 and Rm3.

Figure 4:
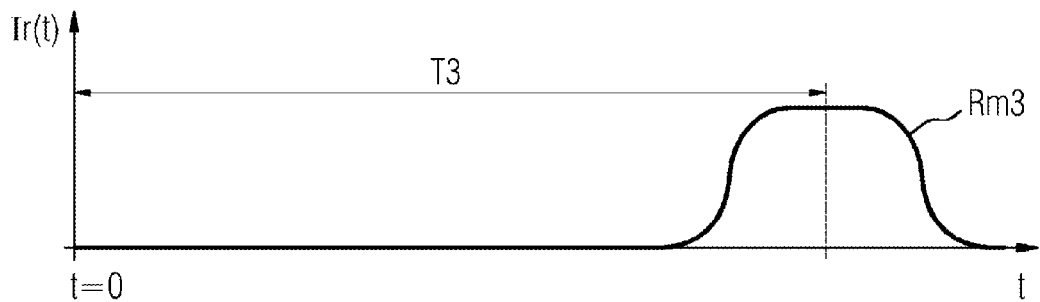

FIGS. 2-4 show that the time periods between the respective electromagnetic excitation pulse Pin and the associated backscatter pattern Rm1, Rm2 and Rm3 during the travel of the rail vehicle 110 on the section of rail 100 will increase; this is due to the fact that the transit time of the electromagnetic pulses and the transit time of the electromagnetic backscatter patterns in the waveguide 50 become longer as the distance of the rail vehicle 110 from the pulse-generating device 20 or the detection device 30 becomes longer.

The evaluation device 60 is therefore able to determine the distance and therefore the location of the rail vehicle 110 on the basis of the time periods T1, T2 and T3 and to generate a corresponding distance signal Se which forms an additional location-determining signal. The distance Ls of the rail vehicle 110' in FIG. 1 can be calculated, for example, according to:

$$Ls = 1/2 * T2/V$$

where V indicates the speed of the pulses in the waveguide 50. The time period T2 can be obtained from the measurement according to FIG. 3. The factor 1/2 takes into account the fact that the radiation has to pass through the respective waveguide section twice, specifically once in the forward direction and once in the return direction. For the speed V the following applies, for example:

$$V = c0/n$$

where c0 indicates the speed of light and n the refractive index in the waveguide 50.

The detection device 30 is therefore able to determine the location of the rail vehicle 110 additionally also on the basis of the time periods T1, T2 and T3 which pass between the transmission of the pulses Pin and the reception of the respective backscatter pattern Rm1, Rm2 and Rm3.

It is considered particularly advantageous if, in the case of a process of determining the location of the rail vehicle 110 in the region of one of the location-determining sections 51 to 53 and the generation of a corresponding location signal So, the evaluation device 60 additionally performs plausibility checking. Such plausibility checking can take place, for example, in such a way that when one of the location-determining sections 51 to 53 is detected and a location signal So is generated the evaluation device 60 evaluates the time period between the generation of the pulse and the arrival of the backscatter pattern (cf. time period T2 according to FIG. 3) and determines the distance Ls of the rail vehicle 110. Subsequently, the evaluation device 60 can check whether the distance signal Se corresponds to the location signal So which is formed.

The evaluation device 60 will for example generate a fault signal F if the difference between the position Ls indicated by the distance signal Se and the known position of the detected location-determining section 51 exceeds a predefined threshold value. The same applies to plausibility checks for the other location-determining sections.

Figure 5:
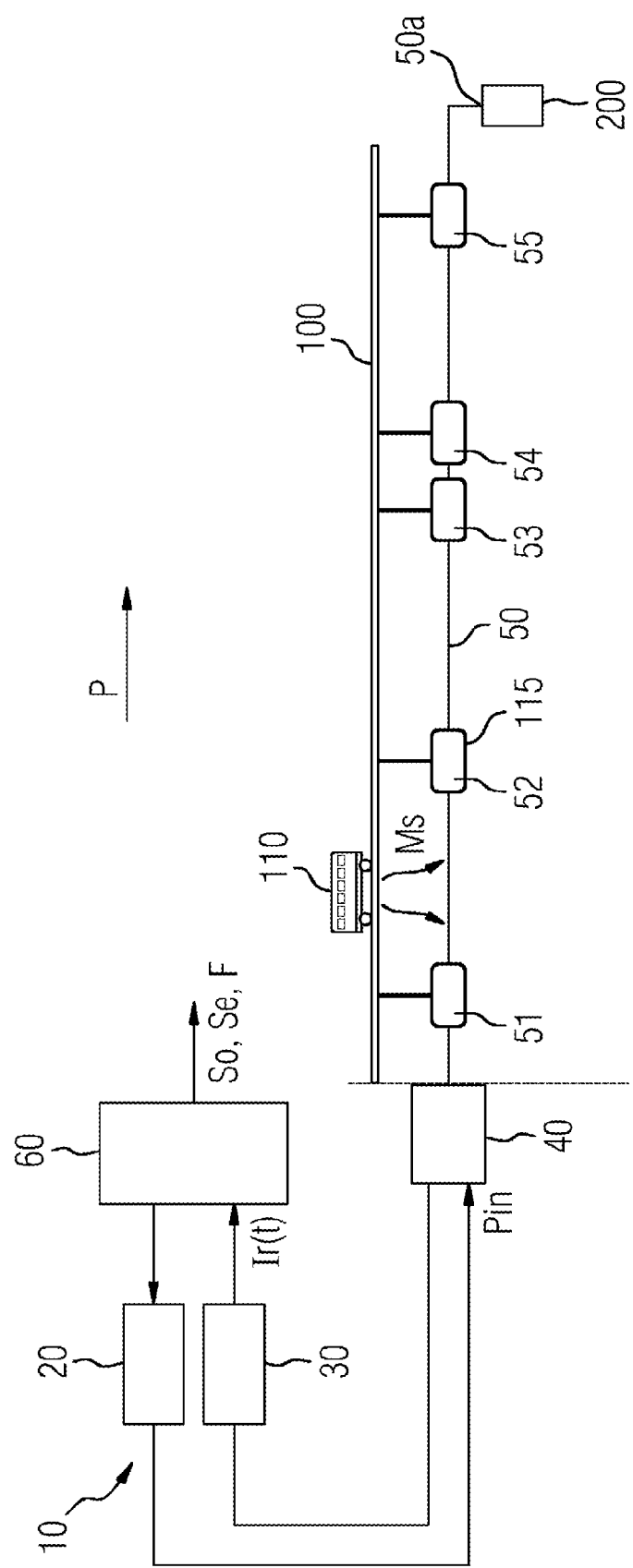
FIG. 5 shows an exemplary embodiment of a location-determining device according to the invention in which location-determining sections form location coding.

FIG. 5 shows an exemplary embodiment of a location-determining device 10 according to the invention in which the waveguide 50 has a multiplicity of location-determining sections 51 to 55 which are arranged in such a way that they form location coding. This location coding makes it possible to detect the location of the rail vehicle 110 on the section of rail 100 without having to observe or count the occurrence of the location-determining sections.

For reasons of clarity, the location coding is indicated by a coded arrangement of the location-determining sections 51 to 55 only on the basis of a small number of location-determining sections; it is self-evident that the location coding can be optimized with respect to its accuracy and evaluation capability if a very much larger number of location-determining sections is used.

The location coding by coding the location of the arrangement of the location-determining sections can be carried out, for example, in such a way that binary coding patterns are formed by means of the location-determining sections.

Figure 6:
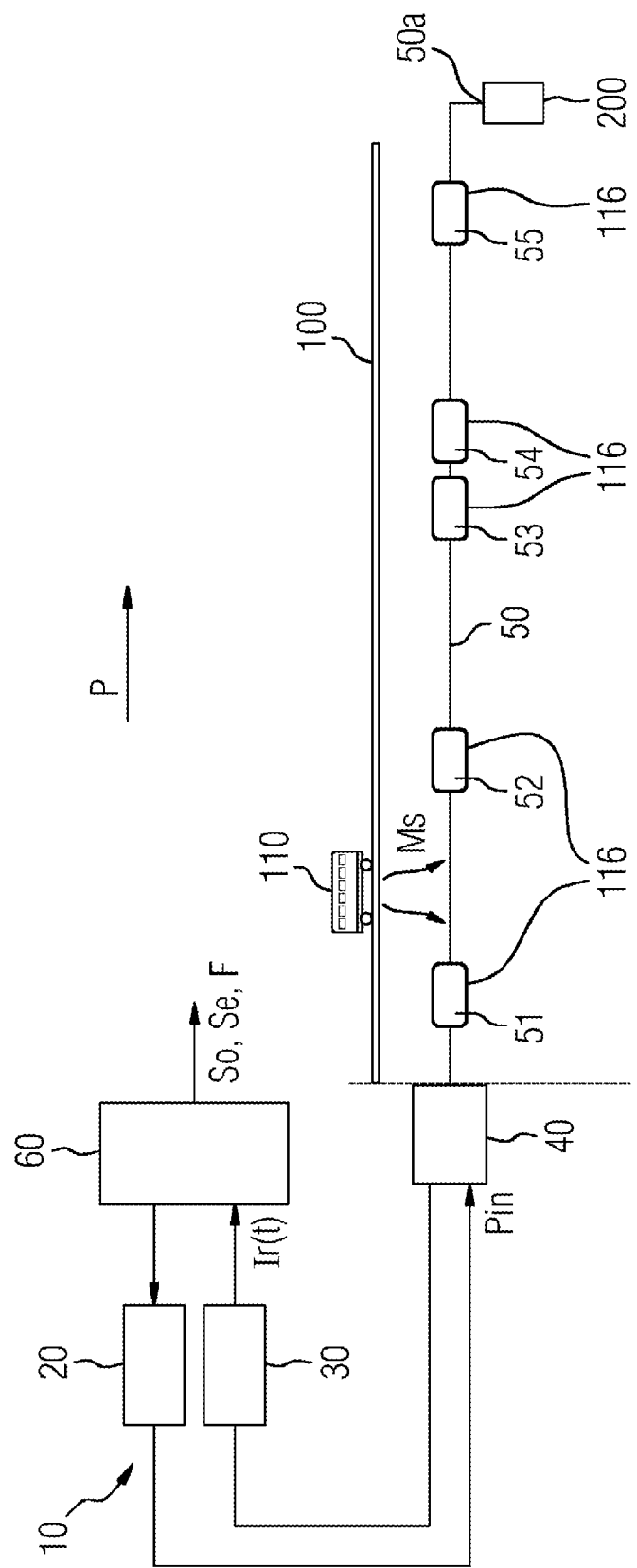
FIG. 6 shows a further exemplary embodiment of a location-determining device according to the invention.

FIG. 6 shows an exemplary embodiment of a location-determining device 10 in which the waveguide 50 is equipped with location-determining sections 51-55 in which the vibration acting on the waveguide 50 as a result of a rail vehicle passing is less than outside the location-determining sections 51-55. The reduction in the vibration in the location-determining sections 51 to 55 is due, for example, to the fact that the waveguide 50 is mechanically entirely or at least to a certain extent decoupled in these sections from the tracks of the section of rail 100 by means of one or more damping elements 116 which each form a vibration-reducing device. Additionally or alternatively, a waveguide material which has per se a lower vibration sensitivity than the waveguide material outside the location-determining sections 51 to 55 can also be used in the location-determining sections 51 to 55.

Figure 8:
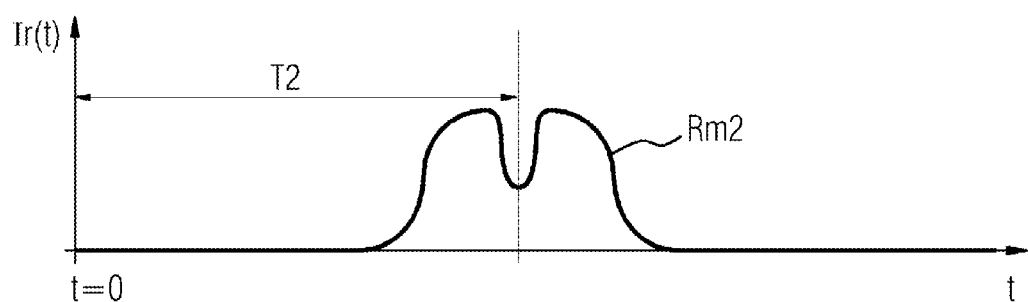

If the rail vehicle 110 then moves in the direction P of the arrow according to FIG. 6, it will cause the location-determining section 51 of the waveguide 50 to experience mechanical oscillations. The vibration acting on the waveguide 50 and/or the vibration sensitivity thereof is however very much less in the region of the location-determining section 51 than outside the location-determining sections 51-55, with the result that the amplitude of the backscatter pattern is reduced. This is illustrated in FIG. 8.

Figure 7:
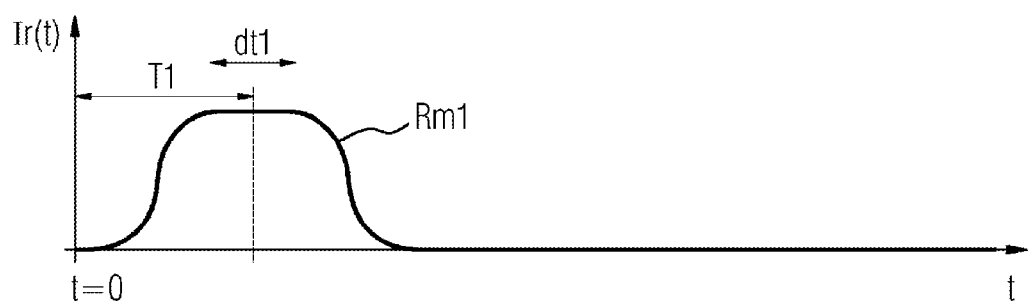
FIGS. 7-9 show by way of example backscatter patterns which are generated by a vehicle on the route according to FIG. 6.
Figure 9:
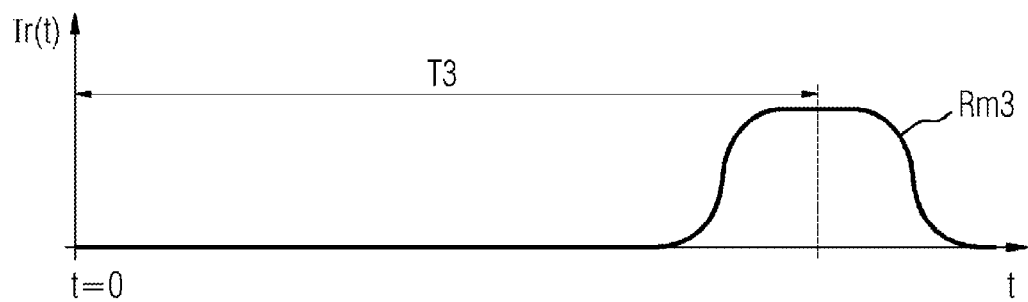

When the rail vehicle 110 leaves the region of the location-determining section 51 again and arrives in the region between the two location-determining sections 51 and 52 (cf. the position of the rail vehicle characterized by the reference symbol 110 in FIG. 6), the amplitude of the backscatter pattern will increase again to the normal amount. Accordingly, the amplitude of the backscatter pattern Rm3 (cf. FIG. 9) corresponds again to the original amplitude of the backscatter pattern Rm1 according to FIG. 7.

Figure 10:
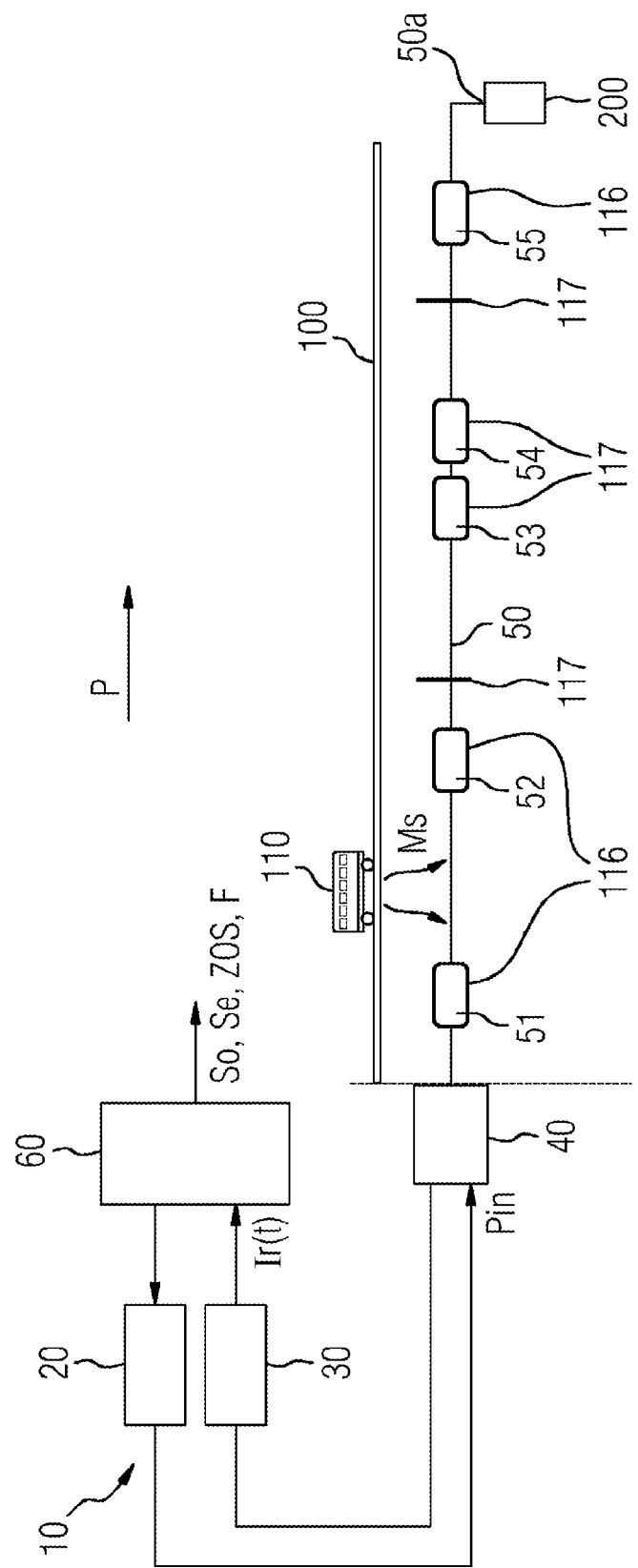
FIG. 10 shows a further exemplary embodiment of a location-determining device according to the invention.

FIG. 10 shows an exemplary embodiment of a location-determining device 10 in which reflections at interference points 117 which are introduced into the waveguide and whose position is known are measured and an additional location-determining signal ZOS is generated if the reception of the backscatter pattern coincides chronologically with a reflection by such an interference point.

Figure 11:
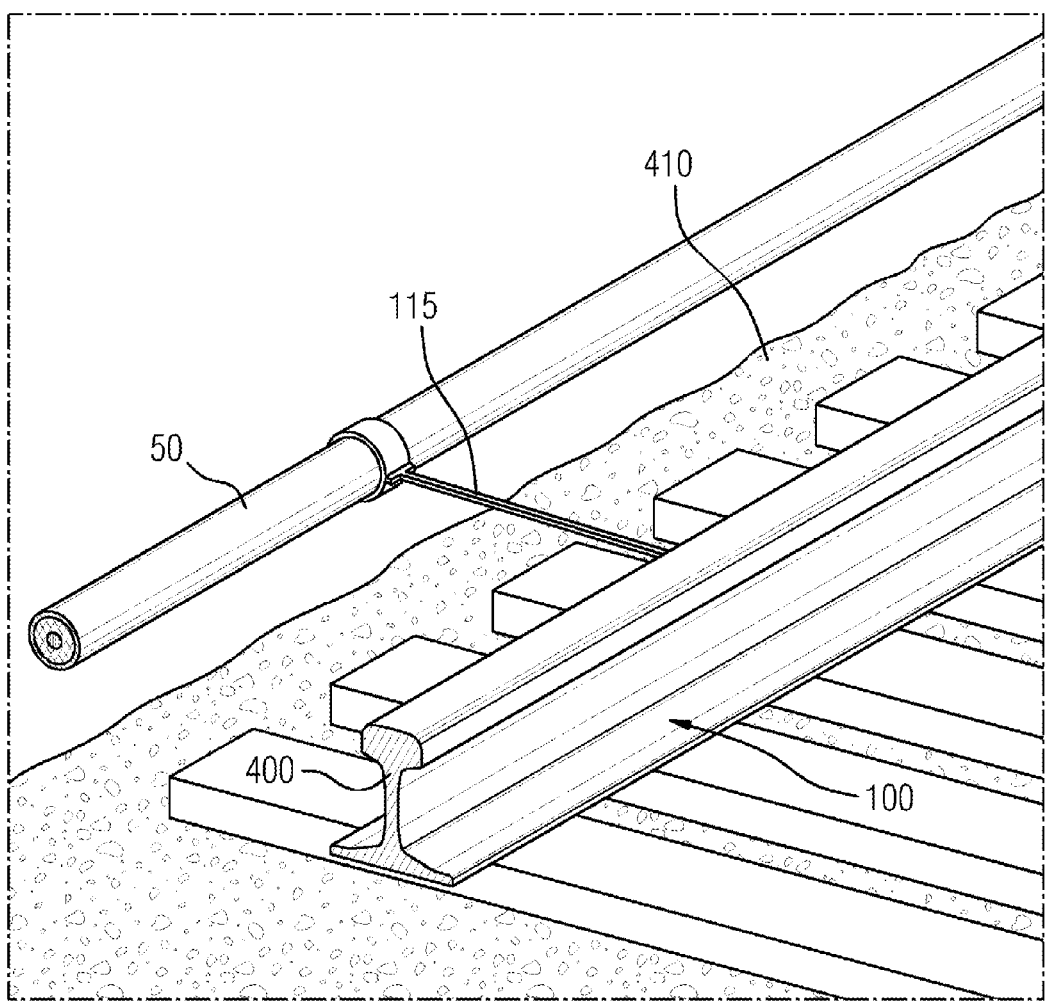
FIG. 11 shows an exemplary embodiment of a connecting element in more detail.

FIG. 11 shows an exemplary embodiment of a connecting element 115 with which the track 400 of the section of rail 100 is connected to the waveguide 50 in a locally mechanical fashion. The connecting element 115 can be, for example, a rod, a pin or a tube. The connecting element is made to extend perpendicularly from the track 400 through the track bed 410 to the waveguide 50.

Although the invention has been illustrated and described in more detail by means of preferred exemplary embodiments, the invention is not restricted by the disclosed examples and other variations can be derived therefrom by a person skilled in the art without departing from the scope of protection of the invention.

The invention claimed is:

1. A method of determining a location of a rail vehicle along a section of rail along which a waveguide is laid, wherein the method comprises:
providing the waveguide along the section of rail with at least one location-determining section in which a vibration sensitivity of the waveguide and/or a vibration acting on the waveguide is greater than or less than outside the location-determining section;
feeding chronologically successive electromagnetic pulses into the waveguide and receiving for each emitted pulse at least one backscatter pattern generated by vehicle-induced backscattering of the electromagnetic pulse;
evaluating an amplitude of the received backscatter patterns; and
generating a location signal if the amplitude of the received backscatter patterns increases or decreases in a chronological sequence.

2. The method according to claim 1, which comprises determining a location of a rail vehicle traveling on a section of rail, wherein a vibration acting on the waveguide in the location-determining section is increased by way of a local mechanical coupling between the waveguide and the section of rail or reduced by way of a vibration-reducing device.

3. The method according to claim 1, which comprises increasing or decreasing the vibration sensitivity of the waveguide in the location-determining section by employing in the location-determining section waveguide material with a higher or lower vibration sensitivity than in a waveguide section located immediately in front of the location-determining section and in a waveguide section located immediately behind the location-determining section.

4. The method according to claim 1, which comprises generating an additional location-determining signal which indicates a location of the rail vehicle.

5. The method according to claim 4, which comprises:
measuring reflections at interference points which are introduced into the waveguide and whose position is known; and
generating the additional location-determining signal if a reception of the backscatter pattern coincides chronologically with a reflection by a respective interference point.

6. The method according to claim 4, which comprises:
measuring the time period between the feeding of the electromagnetic pulses into the waveguide and the detection of the respectively associated backscatter pattern; and
generating a distance signal which indicates the location of the rail vehicle as the additional location-determining signal on the basis of the time period.

7. The method according to claim 4, which comprises generating a fault signal if a distance between the position of the vehicle indicated by the additional location-determining signal and a known position of the location-determining section exceeds a predefined threshold value.

8. The method according to claim 1, which comprises:
providing the waveguide along the section of rail with a multiplicity of location-determining sections in which the vibration sensitivity of the waveguide and/or the vibration acting on the waveguide is greater than or less than in a waveguide section located in front of and in a waveguide section located behind the respective location-determining section; and generating in each case a location signal if the amplitude of the received backscatter patterns in the chronological sequence increases or decreases.

9. The method according to claim 8, which comprises, when the rail vehicle drives into the section of rail after an initial generation of the location signal, counting the occurrence of the further location signals, and forming location-determining information with the respective counter reading.

10. The method according to claim 8, wherein:
an arrangement of the location-determining sections and/or a respective length of the location-determining sections defines location coding; and the method further comprises, during the evaluation of the chronological sequence of the backscatter patterns, detecting the location coding and differentiating the location-determining sections on a basis of the location coding.

11. A location-determining device for determining a location of a rail vehicle along a section of rail, comprising:
a waveguide laid along the section of rail, said waveguide having at least one location-determining section in which a vibration sensitivity of the waveguide and/or a vibration acting on the waveguide is greater than or less than outside said location-determining section;

a pulse-generating device for generating and feeding chronologically successive electromagnetic pulses into said waveguide;

a detection device for detecting electromagnetic backscatter patterns generated by vehicle-induced backscatter; and an evaluation device for evaluating the backscatter patterns, said evaluation device being configured for determining the location of the rail vehicle by at least also using an amplitude of the backscatter pattern.

12. The location-determining device according to claim 11, wherein:
said waveguide is laid next to a section of rail; and the vibration, acting on said waveguide, in the location-determining section is increased by way of a local mechanical coupling between said waveguide and the section of rail or reduced by a vibration-reducing device.

13. The location-determining device according to claim 11, wherein said waveguide has, in the location-determining section, waveguide material with a higher or lower vibration sensitivity than in a waveguide section in front of and adjoining the location-determining section and in a waveguide section behind and adjoining the location-determining section.

14. The location-determining device according to claim 11, wherein said waveguide along the section of rail has a multiplicity of location-determining sections in which the vibration sensitivity of the waveguide and/or the vibration acting on the waveguide is greater than or less than in a waveguide section in front of and adjoining the location-determining section and in a waveguide section behind and adjoining the location-determining section.

15. The location-determining device according to claim 14, wherein an arrangement of said location-determining sections and/or a respective length of said location-determining sections defines location coding.

* * * * *